J SKELLEY.
Carriage-Wheel.
No. 12,330.
Patented Jan. 30. 1855.
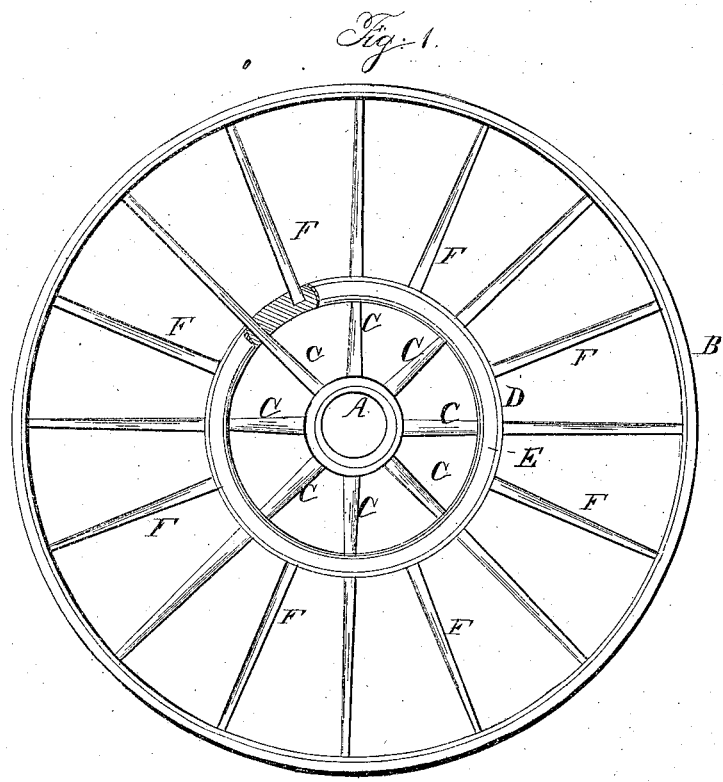
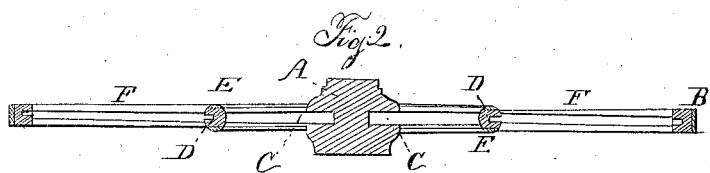

UNITED STATES PATENT OFFICE.

JOHN SKELLEY, OF BROOKLYN, NEW YORK.

CARRIAGE-WHEEL.

Specification of Letters Patent No. 12,330, dated January 30, 1855.

*To all whom it may concern:*

Be it known that I, JOHN SKELLEY, of Brooklyn, in the county of Kings and State of New York, have invented a new and useful Improvement in Carriage-Wheels; and I do hereby declare that the following is a full, clear, and exact description of the same, reference being had to the annexed drawings, making a part of this specification, in which—

Figure 1, is a face view of my improved carriage wheel. Fig. 2, is a section of do. the plane of section being parallel with the axis of the wheel.

Similar letters of reference indicate corresponding parts in the two figures.

This invention relates to a new and useful improvement in carriage wheels, and consists in the peculiar construction of the wheel as will be hereafter fully shown and described whereby light or small hubs may be used and a more durable and stronger wheel obtained than the ordinary ones now made.

To enable others skilled in the art to fully understand and construct my invention, I will proceed to describe it.

A, represents the hub of the wheel and B is the rim.

C are spokes one end of which are secured in mortises in the hub A and the opposite ends are secured in the inner side of the rim B, in the usual manner.

D is a ring or band which is formed of wooden segments placed between the spokes C at any proper point between the hub A and rim B, or the ring or band may be made of an entire piece of wood with holes bored through it to allow the spokes C to pass through. At each side of the ring or band D there is screwed a circular metallic plate or band E, of sufficient thickness to give the ring or band the requisite strength.

F are short spokes one end of which are secured in the outer edge of the ring or band D, and the opposite ends are secured in the inner side of the rim B, the long and short spokes being placed alternately in the wheel.

There are from 16 to 18 spokes in ordinary carriage and light wagon wheels and this number is essential as steamed or boiled fellies are used and if the fellies were not supported by a requisite number of spokes the fellies would flatten or become depressed between the spokes, and this now generally occurs after the wheel has been subjected to some wear.

It is customary to use small hubs in the construction of carriage wheels, they are considered ornamental and add much to the light appearance of the wheel. Large hubs would render a vehicle unsalable.

It will be seen that a small hub with mortises made in it to receive 16 or 18 spokes will be much cut up and weakened, besides there cannot be much of a shoulder allowed for the spokes as they are close together near the hub. By my improvement the hub has only half the usual number of mortises cut in it and the long spokes C, may have requisite shoulders at their ends adjoining the hub so that the spokes C may be well supported in the hub and prevented from working or becoming loose therein. At the same time the fellies composing the rim B are well supported as the usual number of spokes are inserted in them, the ring or band D allowing the requisite support to be given the fellies by means of the short spokes, and also diminishing the number of mortises usually made in the hub. Thus by my improvement a strong and durable wheel is obtained. The spokes are well supported by a ring or band and prevented from twisting or bending when the tire is shrunk on the rim. Small hubs may be used, and the cost of manufacture will not exceed that of the ordinary wheels.

Having thus described my invention, what I claim as new and desire to secure by Letters Patent is—

Constructing the wheel as herein shown and described, viz: Having a concentric ring or band D, constructed of wood as herein shown and secured by metallic bands E, E, on its sides, said ring or band being at any proper point between the hub A, and rim B of the wheel and having the half spokes F secured between the rim and ring or band and the whole spokes passing through said ring or band, for the purpose as herein shown and described.

JOHN SKELLEY.

Witnesses:
S. H. WALES,
I. G. MASON.